United States Patent [19]

Otsuka et al.

[11] Patent Number: 5,232,774
[45] Date of Patent: Aug. 3, 1993

[54] ANCHOR BOLT-SETTING CAPSULE

[75] Inventors: Masanori Otsuka; Masami Jimu; Minoru Fukuzawa, all of Shiga; Hiroki Ohata, Mukou, all of Japan

[73] Assignee: Kabushiki, Kaisha Alpha Giken, Osaka, Japan

[21] Appl. No.: 815,210

[22] Filed: Dec. 31, 1991

[51] Int. Cl.⁵ .............................................. B65D 65/28
[52] U.S. Cl. ........................ 428/321.5; 428/34.1; 428/325; 206/568
[58] Field of Search ............. 428/43, 34.1, 321.5; 405/259.6, 259.5, 259.3, 233, 191; 411/23, 258; 156/92; 206/217, 222, 568

[56] References Cited

U.S. PATENT DOCUMENTS 4,353,463 10/1982 Seemann ...................... 405/259.6
4,894,269 1/1990 Kimura ................................ 428/43

FOREIGN PATENT DOCUMENTS 63-217037 9/1988 Japan .

OTHER PUBLICATIONS 63-44568 Kimura, Adhesive Capsule, Patent Abstracts of Japan, ABS vol. No. 13, No. 542, Dec. 5, 1989.
Translation of Claim: Japanese Kokai Patent Publication No. 63-217037 dated Sep. 9, 1988.

Primary Examiner—Patrick J. Ryan
Assistant Examiner—W. Krynski
Attorney, Agent, or Firm—Armstrong, Westerman, Hattori, McLeland & Naughton

[57] ABSTRACT

An anchor bolt-setting capsule containing a 2-cyanoacrylate component and a cure accelerator. In use, the capsule is set in the bolt hole and the anchor bolt is then driven. The resulting disintegration of the capsule results in immediate reaction of the two components to provide a firm bond securing the anchor bolt in position.

1 Claim, 1 Drawing Sheet (A)

(B)

ANCHOR BOLT-SETTING CAPSULE

FIELD OF THE INVENTION

The present invention relates to an anchor bolt-setting capsule for securing an anchor bolt rigidly in a bolt hole within a very brief time.

BACKGROUND OF THE INVENTION

There is known a technology for setting an anchor bolts rigidly in a substrate structure such as a reinforced concrete block or a rock bed which comprises providing an encapsulated two-component adhesive system wherein one of the components is kept separate from the other component, drilling a hole in the substrate structure, setting the capsule in the hole and threading or driving an anchor bolt into the hole to thereby destroy the capsule for admixing the two components. In such a system, an accelerator is sometimes used to speed up the curing reaction.

As the adhesive agent for such a system, either an inorganic adhesive or an organic adhesive is employed but since inorganic adhesives generally are low in cure rate, organic adhesives are generally preferred. As to the curing component, one suited to the adhesive component is selectively employed.

In Japanese Patent Publication No. 38-12863, for instance, a synthetic resin adhesive such as a polyester, melamine or polyurethane adhesive is used as the adhesive component and a peroxide such as benzoyl peroxide is used as the curing component. Moreover, as an accelerator, dimethylaniline, cobalt naphthenate or the like is employed.

Japanese Patent Publication No. 48-41181 and Japanese Kokai Patent Publication No. 51-142810 disclose examples in which a polyester resin is used in combination with benzoyl peroxide.

Japanese Kokai Patent Publication No. 63-217037 shows examples employing a methacrylic resin-peroxide system. In Japanese Kokai Patent Publication No. 63-142200, No. 63-3154747 and No. 1-223300, an unsaturated polyester resin, methacrylic resin, epoxy-acrylate resin, or epoxy resin is used in combination with a peroxide, amine or acid anhydride.

Japanese Kokai Patent Publication No. 1-275681 mentions an unsaturated polyester resin, acrylic resin or vinyl ester resin as the adhesive component and a peroxide as the curing component.

Thus, for use in an anchor bolt-setting capsule, there have been proposed organic adhesive agents such as unsaturated polyester, acrylic, epoxy-acrylate, epoxy, melamine, vinyl ester and polyurethane resins as adhesive components and peroxides, amines and acid anhydrides as curing components. However, when these systems are applied to anchor bolts, the following problems are inevitable.

While these organic adhesive systems generally insure reduced cure times as compared with inorganic cements, the cure time typically is still as long as about 30 minutes at a temperature of 20° C. and, as the ambient temperature falls, increases drastically to, for example, about 2 hours at 10° C. and 8 to 24 hours at 0° C.

In addition, depending on the pattern of fragmentation of the capsule, the contact between the adhesive component and the curing component is sometimes poor so that one cannot always expect that all the anchor bolts driven will be uniformly secured in position within a given time period. For insuring a uniform destruction of the capsule, it has also been proposed to adopt special capsule structures or special anchor bolt tip configurations but such practices not only impose limitations on usuable containers and anchor bolts but are self-limited in respect of reliability because anchoring operations are sometime carried out under poor field conditions.

OBJECTS AND SUMMARY OF THE INVENTION

The object of the present invention is to provide an anchor bolt-setting capsule which insures a drastically reduced cure time with minimal temperature dependence and does not call for any special contrivances in the capsule or anchor bolt configuration. The invention can be embodied in the following alternative modes.

1. An anchor bolt-setting capsule comprising a destructible container 1 in which a 2-cyanoacrylate adhesive agent 2 is hermetically sealed.

2. An anchor bolt-setting capsule comprising a first destructible container 11 and a second destructible container 12 disposed within said first destructible container 11, with either a 2-cyanoacrylate component 2 or a compatible cure accelerator component 3 being sealed in said second destrucible container 12 and the other component in the residual space of said first destructible container 11.

3. An anchor bolt-setting capsule comprising a pair of destrucible unit containers 11, 12 jointed together, either a 2-cyanoacrylate component 2 being sealed in one of said containers and a cure accelerator component 3 in the other container.

4. An anchor bolt-setting capsule comprising a first destructible container 11 and a second destructible container 12, which are independent of each other, either a 2-cyanoacrylate component 2 being sealed in one of said containers and a cure accelerator component 3 in the other container.

5. An anchor bolt-setting capsule comprising a destructible container 1 in which a 2-cyanoacrylate component 2 is sealed and the exterior surface of which is coated with a cure accelerator 3.

DETAILED DESCRIPTION OF THE PREFERRED EMBODIMENTS

Figure 1:
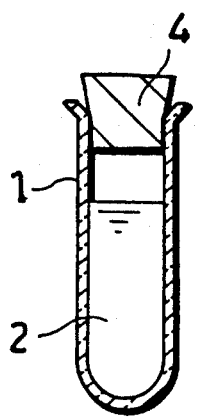
FIG. 1 is a sectional view showing an anchor bolt-setting capsule embodying the principles of the invention.

A destructible container 1, 11 or 12 may be made of any suitable material, rigid or friable, such as glass, ceramics, plastics, etc. only if it can be destroyed as an anchor bolt is driven. Preferably, the container is a tube made of glass because it is easy to destroy, able to keep a 2-cyanoacrylate component 2 or a cure accelerator component 3 stable therein, and transparent to permit a clear view of the contents. Furthermore, a glass tube is advantageous in that fragments formed can act as an aggregate to prevent shrinkage of the cured composition and considerably enhance the structural rigidity of the set belt. It should be understood that even when materials other than glass are used, their fragments also function as aggregates.

The container 1, 11 or 12 is more conveniently configured as a cylinder or an ampule but any other appropriate shape may be adopted.

The 2-cyanoacrylate can be any of various 2-cyanoacrylates of the formula

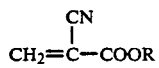

where R may, for example, be an alkyl, alkenyl, alkynyl, cycloalkyl, aryl, alkoxyalkyl or tetrahydrofurfuryl group. The most typical are alkyl 2-cyanoacrylates wherein R is an alkyl group of 1 to 4 carbon atoms.

Highly purified 2-cyanoacrylates have the property to cure in a matter of seconds but when an accelerator 3 to be described hereinafter is used in combination, the 2-cyanoacrylate may not have been highly purified. Thus, practically acceptable short-time cure can be obtained even with an inexpensive 2-cyanoacrylate which cures in a time period of the order of minutes.

The 2-cyanoacrylate component 2 is produced by adding minor amounts of an anionic polymerization inhibitor and a radical polymerization inhibitor to said 2-cyanoacrylate and, where necessary, further adding such optional additives as thickners (e.g. poly-2-cyanoacrylate, polyacrylate, polymethacrylate, polydiallyl phthalate, nitrocellulose, etc.), thixotropic agents (e.g. finely divided silica), bond improving agents, plasticizers, carbonates, colorants and so on.

The cure accelerator 3 that can be used includes, among others, amines, phosphonium salts, vinyl ethers, vinyl thioethers, quaternary ammonium salts, inorganic bases and other substances having the property to accelerate cure of 2-cyanoacrylates. The following is a partial list of such cure accelerators.

Triethylamine, diethylamine, isopropylamine, butylamine, dibutylamine, tributylamine, N,N-dimethylaniline, N,N-diethylaniline, N,N-dimethyl-p-toluidine, N,N-dimethyl-m-toluidine, N,N-dimethyl-o-toluidine, dimethylbenzylamine, pyridine, picoline, vinylpyridine, ethanolamine, diethanolamine, propanolamine, ethylenediamine, o-phenylenediamine, trichloroacetamide, succinimide, formamide, dimethylformamide, dimethylacetamide, piperidine, pyrroline, tris[1-(2-methyl)aziridinyl]phosphine oxide, 2,4-lutidine, 3,4-lutidine, 6-amino-2-picoline, 4-dimethylaminopyridine, 2-aminopyridine, 1-vinylimidazole, 4-vinylpyridine and so on.

The anchor bolt-setting capsule as a first embodiment of the invention comprises a destructible container 1 in which said 2-cyanoacrylate component 2 has been sealed hermetically and a crucial aspect of this embodiment lies in the use of the 2-cyanoacrylate adhesive.

However, in order to accelerate the cure, the following second to fifth embodiment are preferred.

The anchor bolt-setting capsule as the second embodiment of the invention comprises a first destructible container 11, a second destructible container 12 which contains either one of said 2-cyanoacrylate component 2 and cure accelerator component 3 as hermetically sealed in, with the other component being sealed in the space other than said second destructible container 12.

The anchor bolt-setting capsule as the third embodiment of the invention comprises a destructible container 11 and a destructible container 12 as disposed in "juxtaposition", with said 2-cyanoacrylate component 2 being sealed in one of said containers with the accelerator component in the other container. The term "juxtaposition" means any of various arrangements, for example the disposition of two containers 11, 12 as lengthwise interconnected, the arrangement of the two containers in complementary relation, and further the mode in which a given container is divided into two spaces corresponding to said containers 11, 12.

The anchor bolt-setting capsule as the fourth embodiment of the invention comprises destructive containers 11 and 12 as independent units, with the 2-cyanoacrylate component 2 being sealed in one of said units with the accelerator component 3 in the other unit.

The anchor bolt-setting capsule as the fifth embodiment of the invention comprises a destructible container 1 containing said 2-cyanoacrylate component 2 with its exterior surface having a coating of said cure accelerator 3. In this case, as the container 1 is destroyed, the 2-cyanoacrylate component sealed therein flows out and comes into contact with the cure accelerator coated on the exterior surface of the container to undergo rapid curing.

The destroyed container 1, 11 or 12 serves as an aggregate as mentioned above but in order to achieve a still improved filling effect for the anchor, an aggregate or filler may be previously incorporated in the 2-cyanoacrylate component 2. If desired, such aggregate and/or filler may be incorporated in the cure accelerator component 3 or in both the 2-cyanoacrylate or accelerator components. Furthermore, such aggregate or/and filler may be disposed in the container as separated from both the 2-cyanoacrylate component 2 and accelerator component 3. As a further alternative, the aggregate and/or filler may be incorporated in the 2-cyanoacrylate component 2 or/and the cure accelerator component 3 as well as in the container as separate from them.

The aggregate mentioned above includes, among others, silica, crushed stone, sand, glass fragments, glass fiber and so on, while the filler may be selected from among various known inorganic or organic fillers.

An anchor bolt can be set in position and secured with the aid of the capsule of the invention by the following procedure.

First, a substrate structure such as a reinforced concrete structure or a rock bed is drilled to make a hole slightly larger than the outer diameter of the container 1, 11 or 12 and the diameter of the anchor bolt. Then, the hole is blasted with air to remove drilling chips of the substrate structure and, if required, the inside wall of the hole is trimmed with a wire brush and blasted with air. This trimming and air blasting are repeated a few times as necessary.

Thereafter, the capsule of the invention is inserted into the hole and an anchor bolt is driven into the hole with a hammer drill or a manually with a hammer.

This operation results in destruction of the container 1, 11, 12 and the 2-cyanoacrylate adhesive 2 which flows out fills up the clearance between the wall of the hole and the anchor bolt to produce the desired securing effect. When a cure accelerator is used in combination, the 2-cyanoacrylate adhesive 2 cures rapidly on contact with the accelerator 3.

Thus, compared with the prior art systems consisting of an organic adhesive and a curing agent, the capsule of the invention insures a dramatically short cure time which is not much temperature-dependent and does not call for special provisions for assisting in destruction (container configuration, anchor bolt tip configuration, etc.).

Furthermore, because even the 2-cyanoacrylate adhesive alone is fast-curing, a positive cure can be attained even if the curing agent failed to contact the adhesive upon destruction of the container. Therefore, workability in ceiling work, for instance, is improved. Moreover, high anchoring reliability is insured through the uniformity of anchor strength.

EXAMPLES

The following examples are intended to illustrate the present invention in further detail.

EXAMPLE 1

FIG. 1 is a cross-section view showing an example of the anchor bolt-setting capsule according to the invention.

A glass tube, 10 mm in outer diameter and 50 mm long, as an example of destructible container 1, was filled with an instant adhesive 2 based on 2-ethyl cyanoacrylate containing small amounts of hydroquinone and sulfur dioxide and supplemented with polymethyl acrylate thickener. Then, the glass tube was sealed with a polypropylene stopper 4 to provide the desired capsule.

A reinforced concrete block was drilled to make a hole, 10.5 mm in diameter and 130 mm deep, and the above capsule was inserted into the hole. Then, a tapped anchor bolt measuring 10 mm in outer diameter and 300 mm long was driven into the hole with a hammer.

At an outdoor temperature of about 20° C., the anchor bolt was rigidly secured in 7 minutes. After 24 hours, the anchor bolt was subjected to an extraction test. As a result, the anchor bolt was broken. When the reinforced concrete block was cleaved through the bolted region and observed, it was found that fragments of the glass tube had been dispersed as an aggregate in said region.

EXAMPLE 2

Figure 2:
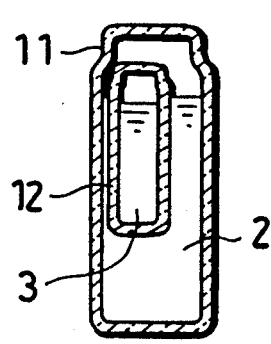
FIG. 2 is a sectional view showing another anchor bolt-setting capsule embodying the principles of the invention.

FIG. 2 is a sectional view showing another anchor bolt-setting capsule according to the invention.

In accordance with this invention, a glass ampule, 30 mm deep, was filled with a 2-cyanoacrylate adhesive 2 and a glass container, 20 mm long, which has been previously filled with N,N-dimethyl-p-toluidine as an example of cure accelerator 3, was placed in the above glass ampule. Then, the ampule was sealed by fusion to provide the desired capsule. Then, in the same manner as described in Example 1, a hole was drilled into a reinforced concrete block, the capsule was set in the hole and an anchor bolt was driven into the hole with a hammer.

At an outdoor temperature of about 20° C., the anchor bolt was rigidly secured in position in about 5 minutes. After 24 hours the anchor bolt was subjected to an extraction test. As a result, the anchor bolt was destroyed.

While the above test was performed at an outdoor temperature of about 20° C., the anchor bolt could be firmly secured in about 10 minutes at an atmospheric temperature of about 10° C. or about 30 minutes even at about 0° C.

EXAMPLE 3

Figure 3:
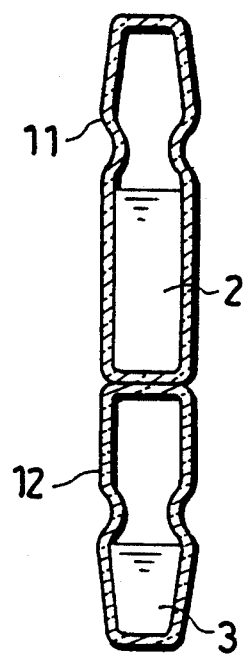
FIG. 3 is a sectional view showing still another anchor bolt-setting capsule embodying the principles of the invention.

FIG. 3 is a sectional view showing still another anchor bolt-setting capsule embodying the principles of the invention.

There was provided a container consisting of glass ampules 11 and 12 jointed at the base. The glass ampule 11 was filled with the 2-cyanoacrylate component 2 and sealed, while the glass ampule 12 was filled with N,N-dimethyl-p-toluidine, a cure accelerator, and sealed to provide a capsule according to the invention.

EXAMPLE 4

Figure 4:
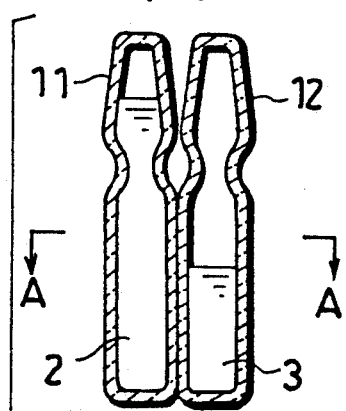
FIG. 4 (a) is sectional view showing a further anchor bolt-setting capsule according to the invention and (b) is a sectional view taken along the line A—A.
Figure 4:
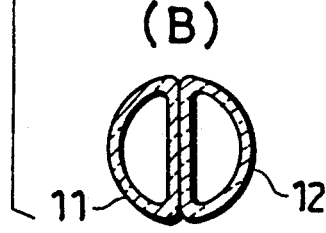

FIG. 4(a) is sectional view showing a further anchor bolt-setting capsule according to the invention and (b) is a sectional view taken along the line A—A.

There was provided a container consisting of glass ampules 11, 12 each having a barrel of semicircular cross-section and jointed to each other at the side. The glass ampule 11 was filled with the 2-cyanoacrylate component 2 and sealed, while the glass ampule 12 was filled with N,N-dimethyl-p-toluidine and sealed to provide a capsule according to the invention.

EXAMPLE 5

Figure 5:
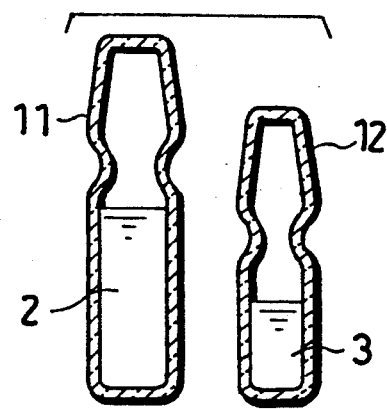
FIG. 5 is a sectional view showing another yet anchor bolt-setting capsule embodying the principles of the invention.

FIG. 5 is a sectional view showing another yet anchor bolt-setting capsule embodying the principles of the invention.

A glass ampule 11 was filled with the 2-cyanoacrylate component 2 and sealed by fusion, while another glass ampule 12 was filled with N,N-dimethyl-p-toluidine and sealed similarly. In this manner, a capsule consisting of separate unit capsules was provided.

EXAMPLE 6

Figure 6:
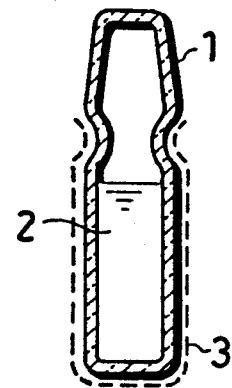
FIG. 6 is a still another anchor bolt-setting capsule according to the invention.

FIG. 6 is a still another anchor bolt-setting capsule according to the invention.

A glass ampule was filled with the same 2-cyanoacrylate adhesive as used in Example 1. The exterior surface of the above ampule was coated with 1-vinylimidazole, a cure accelerator.

As in Example 1, a hole was drilled in a reinforced concrete block, the capsule was set in the hole and an anchor bolt was driven into the hole with a hammer. At an outdoor temperature of about 20° C., the anchor bolt was securely locked in position in about 5 minutes. After 24 hours, an extraction test was performed. As a result, the anchor bolt was broken.

What is claimed is:

1. An anchor bolt-setting capsule comprising a destructible glass ampule in which a 2-cyanoacrylate component is sealed and the exterior surface of which is coated with a cure accelerator.

* * * * *